(12) United States Patent
Jayadeva

(10) Patent No.: US 11,049,011 B2
(45) Date of Patent: Jun. 29, 2021

(54) NEURAL NETWORK CLASSIFIER

(71) Applicant: INDIAN INSTITUTE OF TECHNOLOGY DELHI, New Delhi (IN)

(72) Inventor: Jayadeva, New Delhi (IN)

(73) Assignee: Indian Institute of Technology Delhi, New Delhi (IN)

( * ) Notice: Subject to any disclaimer, the term of this patent is extended or adjusted under 35 U.S.C. 154(b) by 869 days.

(21) Appl. No.: 15/815,309

(22) Filed: Nov. 16, 2017

(65) Prior Publication Data

US 2018/0144246 A1     May 24, 2018

(30) Foreign Application Priority Data

Nov. 16, 2016  (IN) .............................. 201611039147

(51) Int. Cl.
  *G06N 3/08*  (2006.01)
  *G06N 3/04*  (2006.01)
  *G06F 17/12*  (2006.01)
(52) U.S. Cl.
  CPC ............. *G06N 3/08* (2013.01); *G06N 3/0454* (2013.01); *G06N 3/084* (2013.01); *G06F 17/12* (2013.01)

(58) Field of Classification Search
  None
  See application file for complete search history.

(56) References Cited

U.S. PATENT DOCUMENTS

| 8,189,900 B2 * | 5/2012 | Sammak | G06T 7/0014 382/133 |
| 10,534,999 B2 * | 1/2020 | Kwon | G06N 3/0454 |
| 2014/0114885 A1 * | 4/2014 | Han | G08G 1/0133 706/12 |

* cited by examiner

*Primary Examiner* — Luis A Sitiriche
*Assistant Examiner* — Hansol Doh
(74) *Attorney, Agent, or Firm* — Lee & Hayes, P.C.

(57) ABSTRACT

Approaches for classifying training samples with minimal error in a neural network using a low complexity neural network classifier, are described. In one example, for the neural network, an upper bound on the Vapnik-Chervonenkis (VC) dimension is determined. Thereafter, an empirical error function corresponding to the neural network is determined. A modified error function based on the upper bound on the VC dimension and the empirical error function is generated, and used for training the neural network.

8 Claims, 9 Drawing Sheets

NEURAL NETWORK CLASSIFIER

BACKGROUND

This Application claims priority to India Patent Application No. 201611039147, filed Nov. 16, 2016, which is incorporated herein by reference.

Learning machines utilize a variety of training approaches for analyzing data and recognizing patterns. As part of such approaches, the learning machines are trained to generalize using data with known outcomes. Once such learning machines are trained, they may be subsequently used for classification of actual data in cases where the outcome is unknown. For example, a learning machine may be trained to recognize patterns in data. Learning machines may be trained to solve a wide variety of problems across a variety of disciplines. An example of such a learning machine is a support vector machine (SVM). It should be noted that the data to be analyzed may correspond to a variety of technical fields, such as biotechnology, and image processing.

BRIEF DESCRIPTION OF THE DRAWINGS

The following detailed description references the drawings, wherein.

DETAILED DESCRIPTION

Figure 1:
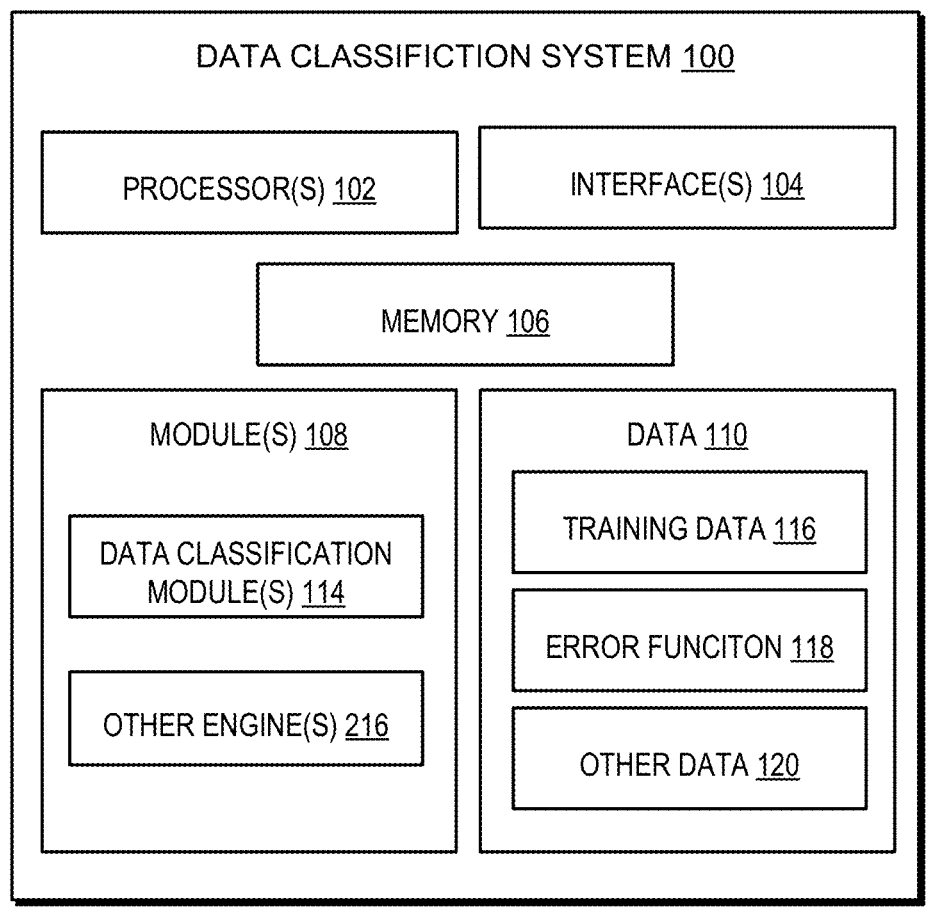
FIG. 1 is a diagram of an example system for classifying training samples with minimal error using a low complexity neural network classifier.

The present subject matter relates to system and methods for classifying data using a neural network classifier. As would be understood, neural networks are used to map or classify a set of input patterns to a set of output patterns. Systems based on neural networks have evolved as a popular machine learning basis, and have been successfully employed in a wide variety of domains for practical applications. With the advent of fast training methods as are generally known in the art, neural networks can be trained quickly. As would be understood, for classifying the input patterns with adequate correctness, the neural networks first need to do undergo a learning exercise which is called the training phase. During the training phase, paired training samples for example depicted as (x, y), of an input x and a corresponding output or label y, are provided to the neural network. The neural network then learns or establishes how to associate or map the given input x with the correct output y.

As is generally understood, for any set of training samples many models of neural networks with different network size may be able to learn the desired mapping between the paired training samples x to y. One of the challenges faced during the design of neural network is, however, the selection of an appropriate network size or model. Smaller neural networks typically require lesser memory and processing to implement, and are generalized more effectively. Smaller networks also have shorter response times and input-output propagation delays. Further, training a smaller neural network is less expensive and computationally efficient. However, smaller neural networks may not be able to classify accurately for all values of input patterns. In fact, neural networks with structures or models simpler than necessary may not give good approximations even for patterns included in its training set. On the other hand, larger neural networks may allow the learning of more complicated mappings but then may also suffer from poor generalization. That is, larger neural network may perform well on patterns included in the training set but perform poorly on unknown patterns. Having a more complicated than necessary structure typically "overfits" the training data.

Statistical learning theory has shown that generalization is closely dependent on the complexity of the model. Various measures of, and bounds on, model complexity have also been proposed in the literature. One such measure is the Vapnik-Chervonenkis dimension (VC dimension), which measures the capacity of a binary classifier. With confidence $(1-\eta)$, the generalization error $R(\lambda)$ is known to be bounded from above by:

$$R_{emp}(\lambda) + \sqrt{\frac{\gamma(\ln(2l/\gamma)+1) - \ln(\eta/4)}{l}}, \text{ where} \quad (1)$$

$$R_{emp}(\lambda) = \frac{1}{l}\sum_{i=1}^{l} |f_\lambda(x_i) - y_i|, \quad (2)$$

and $f_\lambda$ is a function having a VC dimension $\gamma$ with the smallest empirical risk on a dataset $\{x_i, i=1, 2, \ldots, 1\}$ of 1 data points with corresponding labels $\{y_i, i=1, 2, \ldots, 1\}$. Here, the first term is the empirical error over the training samples. As mentioned earlier, in general, a small VC dimension and good generalization go together.

While a number of methods have been proposed in the neural network domain to reduce model complexity, these largely focus on pruning trained networks by removing synapses or neurons through heuristics that are based on some measure of model complexity. Conventional approaches to introduce sparsity in neural networks do not have a firm mathematical basis, and are often implemented by naive methods such as truncation of weights below a specific threshold. This introduces sparsity in the neural network, but may also compromise on the generalization ability (or the test accuracy) obtained by such a neural network. However, for neural networks good generalization is difficult to ensure in the absence of any specific theory. Better generalization however has been achieved through approaches based on Support Vector Machines (SVM). However, SVM based approaches do not effectively scale large datasets. Considering that datasets have become larger, it is desired that neural networks are learned. Such neural networks are likely to result in acceptable generalizations and also provide sparse representations.

To this end, the present subject matter describes systems and methods for training a neural network. In the present implementations, a modified error function is constructed and minimized to train the neural network under consideration. The modified error function is based on an empirical error function and an upper bound of the corresponding VC dimension. In one implementation, the modified error function is the sum of the empirical error and an upper bound on the VC dimension. During learning, by back-propagating the associated partial derivatives of the suggested objective, the weights of the overall network change in a manner to produce a sparse representation of the neural network while yielding a low training error. As would be understood, minimizing the component corresponding to the VC dimension causes sparse networks to be learnt with fewer number of significant nodes (referred also as synapses) within the neural network are manageable and may be removed. For the present implementations, it has been observed that Test set errors on large benchmark datasets are lower, indicating controlled model complexity and improved generalization.

Traditional neural networks only tend to minimize an empirical error function. The present subject matter describes approaches involving a neural network that minimizes an upper bound on the VC dimension while trying to classify one or more training samples with minimum error. As would be explained, a classifier may be learned by minimizing a tight bound on the VC dimension, which provides a sparse representation and at the same time also generalizes well. The upper bound on the VC dimension is further considered along with an empirical error function to form a modified error function. The minimization of the modified error functions results in minimizing the empirical error while minimizing complexity (i.e., keeping the VC dimension small). The manner in which the upper bound of the VC dimension is minimized may be described in a number of techniques. One such technique is described in the published Indian patent application 3615/DEL/2013, the disclosure of which is hereby incorporated by reference.

The approaches as explained in the present application may be adapted without extending beyond the scope of the present application to other settings, architectures, applications or use cases. It should be noted that the minimization of the modified error function may be implemented through any minimization function depending on complexity and area of application, and without deviating from the scope of the present subject matter. With these advantages, the subject matter results in faster response times, smaller computational footprint and provides more suited results when implemented as part of a search engine, say implemented on a web server.

Although the present approaches have been described in the context of a neural network, it may also be applied for a twin neural network. As discussed, SVMs have some challenges when considering large datasets. Furthermore, it may also be noted that the SVM hyperplane is based on finding a single hyperplane lying between two parallel planes. In such cases utilization of an SVM based hyperplane may not be an effective manner to handle or train data based on the distributed datasets, particularly in the case of unbalanced datasets. Such challenges may be addressed by using a twin SVM which addresses the issue pertaining to distributed or unbalanced datasets. However, twin SVM have their own challenges. For example, training and classifying data using twin SVM may involve operations, such as matrices inversion, on large matrices which may not be numerically stable particularly in the case of large datasets. To that end, a modified classifier based on a twin neural network is prescribed for managing samples of two classes and at the same time allowing for better generalization. In this case as well, a modified error function is proposed which includes a component to an empirical error function associated with a twin neural network, and component for minimized upper bound of the VC dimension of the twin neural network under consideration.

The above-mentioned implementations are further described in greater detail herein with reference to the accompanying figures. It should be noted that the description and figures relate to exemplary implementations, and should not be construed as a limitation to the present subject matter. It is also to be understood that various arrangements may be devised that, although not explicitly described or shown herein, embody the principles of the present subject matter. Moreover, all statements herein reciting principles, aspects, and embodiments of the present subject matter, as well as specific examples, are intended to encompass equivalents thereof.

FIG. 1 depicts an exemplary data classification system 100 implemented as a computing-device, for classifying training samples with minimal error. The data classification system 100 may be implemented as a stand-alone computing device or may be implemented as a collection of one or more networked computing devices. Examples of such computing devices include laptops, desktops, tablets, hand-held computing devices such as smart-phones, or any other forms of computing devices. Continuing with the present implementation, the data classification system 100 may further include a processor(s) 102, interface(s) 104 and memory 106. The processor(s) 102 may also be implemented as signal processor(s), state machine(s), logic circuitries, and/or any other device or component that manipulate signals based on operational instructions.

The interface(s) 104 may include a variety of interfaces, for example, interfaces for data input and output devices, referred to as IVO devices, storage devices, network devices, and the like, for communicatively associating the data classification system 100 with one or more other peripheral devices. The peripheral devices may be input or output devices communicatively coupled with the data classification system 100. The interface(s) 104 may also be used for facilitating communication between the data classification system 100 and various other computing devices connected in a network environment. The memory 106 may store one or more computer-readable instructions, which may be fetched and executed for carrying out a forming process for a sheet-metal assembly. The memory 106 may include any non-transitory computer-readable medium including, for example, volatile memory, such as RAM, or non-volatile memory such as EPROM, flash memory, and the like.

The data classification system 100 may further include module(s) 108 and data 110. The module(s) 108 may be implemented as a combination of hardware and programming (e.g., programmable instructions) to implement one or more functionalities of the module(s) 108. In one example, the module(s) 108 includes a data classification module 112, and other module(s) 114. The data classification module 112, in one example, when implemented results in a low complexity neural network classifier. The data 110 on the other hand includes training data 116, error function 118 and other data 120. The error function 118 may be considered as comprising an empirical error and the upper bound of the VC dimension.

As discussed previously, any neural network may be considered as comprising a single neuron or node in the output layer and one or more intermediate layers of other nodes or neurons. The number of intermediate layers may depend on the complexity of the system under consideration. As would be understood, the nodes in the preceding layers are mapped or associated with the penultimate layer by way of a map. The map specifically maps one or more input patterns in a space to an output space which is spanned by the number of nodes within the penultimate layer. The neural network therefore may be considered as a classifier that operates in a number of dimensional patterns corresponding to the number of nodes in the penultimate layer but in the output space.

In one example, the data classification module 112 minimizes the mapping to the penultimate layer as well as the penultimate layer (which is considered as a classifier for the neural network under consideration. Continuing with the present example, the data classification module 112 defines the error function at the output layer. In operation, the data classification module 112 may propagate the error backwards, i.e., in the direction of the preceding layers, to modify one or more weights associated with the respective layers. In one example, the output error function 118 in a conventional neural network is the squared of the empirical error, measured over all the training patterns. The data classification module 112 modifies the error function 118 so that it also minimizes an upper bound on the VC dimension of the classifier formed by the final layer. When the error terms are propagated backwards, the data classification module 112 optimizes the map to keep the output error low, as well as to tune the map formed by the previous layers to minimize the VC dimension of the overall network.

The description in the following portions illustrate the various mathematical derivations representing the upper bound of the VC dimension for a system under consideration as well as the error function 118. It should be noted that the present derivations and the formulation is only indicative and not limiting. Other formulations representing the empirical error and the upper bound of the VC dimension may also be utilized without deviating from the scope of the present subject matter.

In an implementation of the present subject matter, the data classification module 112 operates on a dataset of M data-points (also called samples or patterns)

$$X = \{x^{(1)}, x^{(2)}, \ldots, x^{(M)} | x^{(i)} \in R^n, \forall i\} \text{ with labels}$$

$$y = \{y_1, y_2, \ldots, y_M | y_i \in \{-1, +1\}, \forall i\} \quad (1)$$

Continuing with the present example, the data classification module 112 may consider a hyperplane represented by the following expression:

$$u^T x + v = 0 \quad (2)$$

Further, the VC dimension γ of this hyperplane classifier is upper bound by $h^2$ which in one example may be represented by the following equation, i.e., $$\gamma \leq \beta h^2 \quad (3)$$

where β is a constant independent of u and v; and, $$h = \frac{\text{Max}_{i=1,2,\ldots,M} |u^T x^i + v|}{\text{Min}_{i=1,2,\ldots,M} |u^T x^i + v|}, \quad (4)$$

Once the bound as indicated above is obtained, the data classification module 112 uses the same in the context of a neural network. In the present example, the neural network may be a multi-layered feedforward neural network. As would be understood, a neural network would generally include a single node at the output layer, with a plurality of intermediate layers.

With this, the data classification module 112 may consider the following assumptions to determine the modified error function for classifying training samples with minimal error in a neural network: number of nodes in the penultimate layer denoted by L, the outputs denoted by $z_1, z_2, z_L$, corresponding connecting weights may be denoted by $w_1, w_2, \ldots, w_L$, respectively.

The data classification module 112 may further determine a mapping $\varphi(x)$, i.e. $z = \varphi(x)$ which maps the outputs of this layer based on an input x. The bias of the output neuron is denoted by b. When the i-th pattern $x^i$ is presented at the input, the net input to the output neuron is given by $\text{net}^i = w^T z^i + b$, where i denotes the values of the net input net and z when the i-th pattern is presented at the input layer.

The data classification module 112 may further obtain an activation function of the output neuron as denoted by f(x), where $-1 \leq f(x) \leq 1$. It should be noted that the present activation function is only exemplary—any other activation functions such as the tan h(net) function may also be considered without deviating from the scope of the present subject matter. When training such a neural network, the target of the output neuron is usually chosen to be t>0 (respectively, -t) for input patterns belonging to class 1 (respectively, class -1); a typical value for t may be 0.9.

As the process for classifying training samples with minimal error continues, the data classification module 112 may further consider a set of patterns whose image vectors in the penultimate layer, viz. $z^i$, i=1, 2, . . . , M are linearly separable. When the activation function is applied to the net input to the output node, the following are obtained:

$$f(net^i) \begin{cases} \geq t, & \text{if } y_i = 1 \\ \leq -t, & \text{if } y_i = -1 \end{cases}, \quad (5)$$

where $net^i = (w^T z^i + b)$. This may be written as $$net^i \equiv (w^T z^i + b) \begin{cases} \geq \theta, & \text{if } y_i = 1 \\ \leq -\theta, & \text{if } y_i = -1 \end{cases}, \quad (6)$$

$\Rightarrow |net^i| \geq \theta > 0$, and where $\theta = f^{-1}(t)$.

Generally, $\theta \geq 1$, and f and $f^{-1}$ are monotonically increasing functions. Although the output node uses a continuous activation function as illustrated above, the class of any input pattern is determined by using the sign of the output. Hence, an upper bound on the VC dimension of the system may be considered as that of the classifier that is obtained using the sign of the output of the final layer neuron.

With the above, the data classification module 112 may further determine the upper bound of the VC dimension γ of the classifier formed by the output neuron acting on the inputs z as given by:

$$\gamma \leq \beta \left( \frac{\text{Max}_{i=1,2,\ldots,M} |w^T z^i + b|}{\text{Min}_{i=1,2,\ldots,M} |w^T z^i + b|} \right)^2, \quad (7)$$

From (6), we have $$\gamma \leq \frac{\beta}{\theta^2} (\text{Max}_{i=1,2,\ldots,M} |w^T z^i + b|)^2 \leq \frac{\beta}{\theta^2} \text{Max}_{i=1,2,\ldots,M} |w^T z^i + b|^2, \quad (8)$$

$$\text{Since } \theta \geq 1, \text{Max}_{i=1,2,\ldots,M} |w^T z^i + b|^2 \leq \sum_{i=1}^{M} (w^T z^i + b)^2, \quad (9)$$

Since one of the indices in the summation on the R.H.S. includes the maximum, resolving the above equations, the following is obtained:

$$\gamma \leq \frac{\beta}{\theta^2} \sum_{i=1}^{M} (w^T z^i + b)^2 = \frac{\beta}{\theta^2} \sum_{i=1}^{M} (net^i)^2, \quad (10)$$

The data classification module 112 may further modify the error functional of a neural network by adding the term on the R.H.S. of (10) as a means of minimizing an upper bound on the VC dimension of the neural network classifier. In a classical neural network, a typical error functional is of the form $$E\left[ \frac{1}{2M} \sum_{i=1}^{M} (t_i - f(net_i))^2 \right], \quad (11)$$

In regularized neural networks, this is modified by adding a term proportional to $\|w\|^2$ at individual weights to obtain a low complexity classifier with the modified error functional represented as:

$$\min E = \left[ \frac{1}{2M} \sum_{i=1}^{M} (t_i - f(net_i))^2 \right] + \frac{C}{2M} \sum_{i=1}^{M} (net^i)^2, \quad (12)$$

In the above expressions, M is the number of training samples. The term $t_i$ denotes a desired or target output of the neuron when pattern $x_i$ is presented at the network's input. The term f( ); activation function of the neuron. This, when applied or operated on the net input $net^i$, yields the neuron's output. Here, $net^i$ is the net input present at the input to the neuron, when pattern $x_i$ is presented or applied at the input of the network. The first term of the error function E relates to the classification error, which is the squared errors between the desired output and the actual output of the neuron, the sum is over the training patterns, and the second term relates to the VC dimension of the classifier formed by the final layer of the network or an upper bound on the VC dimension. The requirement for learning is to find a classifier with a small VC dimension that has small error on training patterns. The hyper-parameter C controls the trade-off between the two. The hyper-parameter C weighs the second term of equation (12). A larger value of this term emphasizes the second term of (12) relative to the first term, i.e., it emphasizes the need to minimize the VC dimension, while a smaller value of C will tend to reduce the error on training samples at the cost of a possibly larger VC dimension. It should be noted that the first portion of the above-mentioned equation (12) may vary depending on the architecture of dataset being assessed. Furthermore, it should be noted that second portion of the (12) provides for the various advantages as also mentioned previously. For example, depending on the architecture under consideration, the present subject matter provides faster convergence, sparse solution and better generalizations of say test data. In case of sparse representations, these would involve less computational overhead for testing any new sample. With these advantages, the subject matter results in faster response times, smaller computational footprint and provides more suited results when implemented as part of a search engine, say implemented on a web server.

In an implementation of the present subject matter, the case of multi-class problems may be dealt with by adopting a one-versus-rest approach. In this case, the last layer of the network has one node per class, and each is trained as a binary classifier. If the number of output neurons is N, then the error functional for such a network may be written in the form $$E\left[ \frac{1}{2M} \frac{1}{2N} \sum_{j=1}^{N} \sum_{i=1}^{M} (t_j^i - f(net_j(x^i)))^2 \right] + \frac{C}{2M} \frac{1}{2N} \sum_{j=1}^{N} \sum_{i=1}^{M} (net_j(x^i))^2, \quad (13)$$

where $t_j^i$ and $f(net_j(x^i))$ denote the desired or target values and the actual outputs, respectively, of the j-th output neuron when pattern $x^i$ is presented at the input layer. In this case as well, the modified error function includes the empirical error corresponding to the neural network under consideration, along with the minimized upper bound of the VC dimensions (as is depicted by the second component of equation 13). In one example, the equations (12) and (13) are independent of the number of hidden layers within the neural network.

Figure 2:
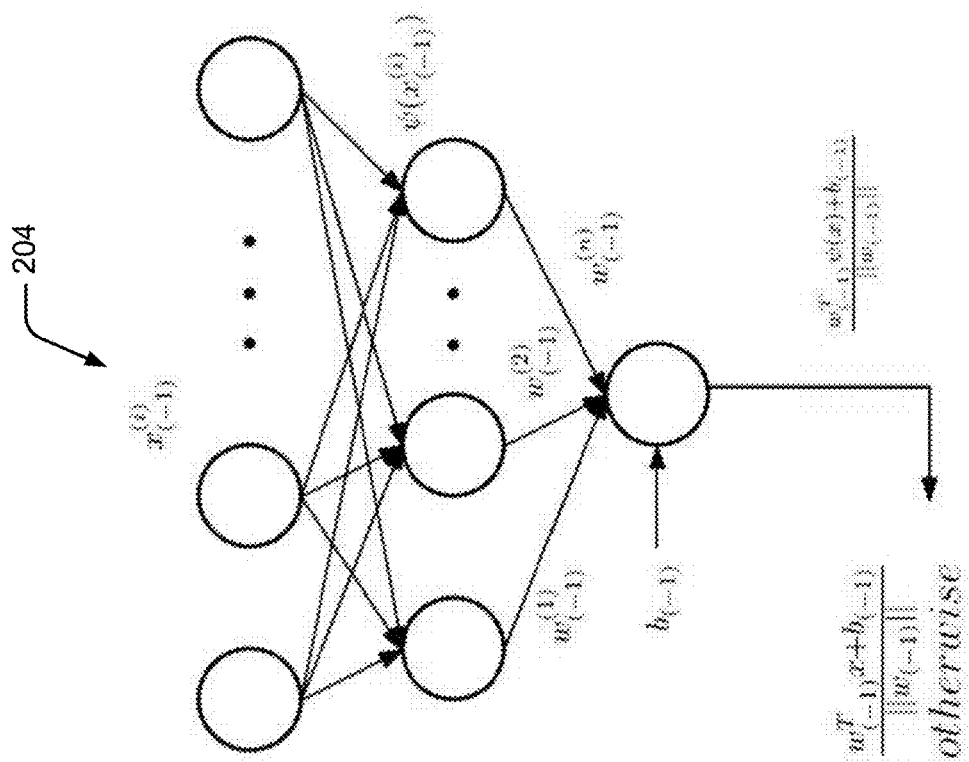
FIG. 2 illustrates an exemplary twin neural network, as per an example of the present subject matter.
Figure 2:
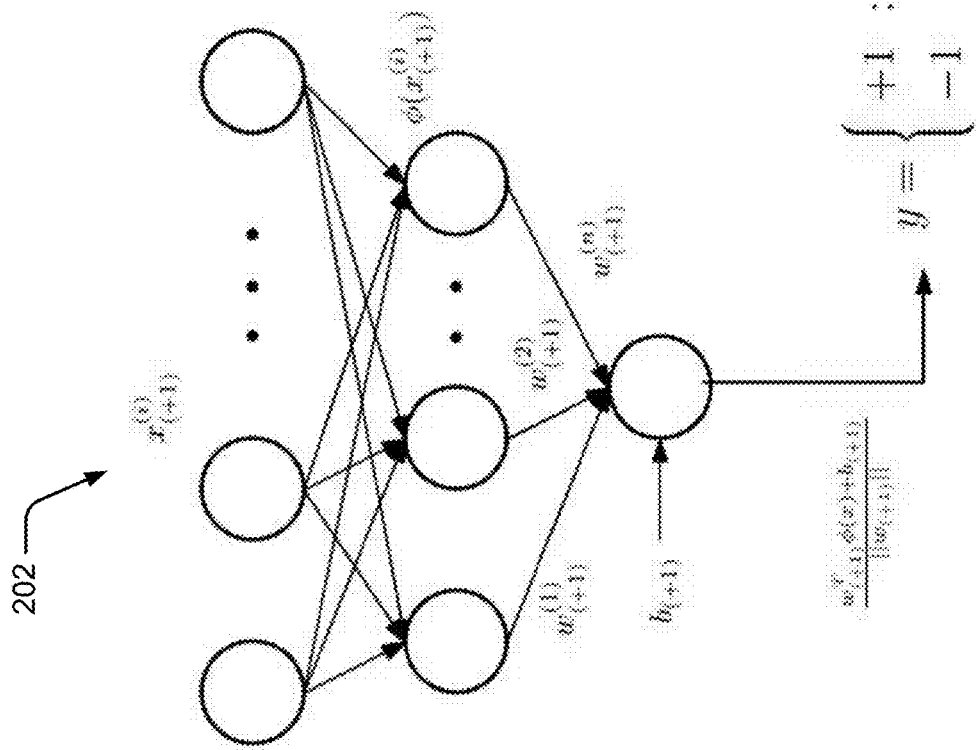

The present approaches may be further extended for distributed or unbalanced datasets using twin neural networks. For the purposes of explanation, a three-layered neural network as depicted in FIG. 2 is considered. FIG. 2 depicts two neural networks 202 and 204. The input layer takes the training samples x (i), i=1, 2 . . . N and transforms it to a space φp(•) by the nodes of the hidden or the intermediate layers. The final or output layer of this network learns a classifier in the feature space denoted by <p(•), and the classifier hyperplane coefficients (weight vector w and bias b are used to arrive at the prediction for a test sample. For the case of an unbalanced dataset, the data classification module 112 trains two networks whose error functions are denoted by E(+1) and E(−1) as is further explained in the following paragraphs. The first error function is denoted by E+1 and the second error function denoted by E−1.

$$E_{+1} = \frac{1}{2N_B} \sum_{i=1}^{N_B} (t_i - y_i)^2 + \frac{C_{+1}}{2N_A} \sum_{i=1}^{N_A} (w_{+1}^T \phi(x_{+1}^i) + b_{+1})^2 \quad (14)$$

$$E_{-1} = \frac{1}{2N_A} \sum_{i=1}^{N_A} (t_i - y_i)^2 + \frac{C_{-1}}{2N_B} \sum_{i=1}^{N_A} (w_{-1}^T \phi(x_{-1}^i) + b_{-1})^2 \quad (15)$$

In the above equations 14 and 15, +1 or −1, when used as a subscript or superscript, refer to the context of samples of class(+1) or class (−1), respectively. For example, $x_{+1}$ refers to samples of class (+1), while $x_{-1}$ refers to samples of class (□1). The hyperplane $w^T_{+1}\phi(x)+b_{+1}=0$ is required to pass through samples of class (+1) and be far from samples of class (−1). Here, $w_{+1}$ is the vector of coefficients that define the hyperplane $w^T_{+1}\phi(x)+b_{+1}=0$, and $b_{+1}$ is the bias or offset of the hyperplane. The hyperplane $w^T_{-1}\phi(x)+b_{-1}=0$ is required to pass through samples of class (−1), and be far from samples of class (+1). Here, $w_{-1}$ is the vector of coefficients that define the hyperplane $w^T_{-1}\phi(x)+b_{-1}=0$, and $b_{-1}$ is the bias or offset of the hyperplane. The terms used in the equations correspond to these two requirements. $C_{+1}$: Hyper-parameter weighting the second term of equation (14). The term $\Sigma_{j=1}^{N_A}(w_{+1}^T\phi(x_{+1}^j)+b_{+1})^2$ is the sum of squared distances of the hyperplane $w^T_{+1}\phi(x)+b_{+1}=0$ from the $N_A$ samples of class +1. The first term of equation (14) is the difference between the output of the final layer neuron and the target. $C_{+1}$ is a hyper-parameter used to tradeoff the importance of the second term of (14) relative to the first term. $C_{-1}$: Hyper-parameter weighting the second term of equation (15). The term $\Sigma_{j=1}^{N_A}(w_{-1}^T\phi(\overline{x}_{-1}^j)+b_{-1})^2$ is the sum of squared distances of the hyperplane $w^T_{-1}\phi(x)+b_{-1}=0$ from the $N_B$ samples of class −1. The first term of equation (15) is the difference between the output of the final layer neuron and the target. $C_{-1}$ is a hyper-parameter used to tradeoff the importance of the second term of (15) relative to the first term. The term $t_j$: is desired or target output of the neuron when pattern $x_i$ is presented at the network's input. The term $y_j$ is actual output of the neuron when pattern $x_i$ is presented at the network's input.

The data classification module 112, in order to minimize the error, may set the corresponding derivatives to zero to obtain update rules for the weight vector w and bias b. The derivatives w.r.t. $w_{(+1)}$ and $w_{(-1)}$ are shown in Eqns. (16)-(17), which correspond to the weight update rules for the twin neural network (such as that depicted in FIG. 2).

$$\frac{\partial E_{(+1)}}{\partial w_{(+1)}} = \frac{1}{N_B} \sum_{i=1}^{N_B} (t_{(i)} - y_{(i)})(1 - y_{(i)}^2)\phi(x_{(-1)}^{(i)}) + \frac{C_{(+1)}}{N_A} \sum_{i=1}^{N_A} (w_{(+1)}^T \phi(x_{(+1)}^{(i)}) + b_{(+1)})\phi(x_{(+1)}^{(i)}) \quad (16)$$

$$\frac{\partial E_{(-1)}}{\partial w_{(-1)}} = \frac{1}{N_A} \sum_{i=1}^{N_A} (t_{(i)} - y_{(i)})(1 - y_{(i)}^2)\phi(x_{(-1)}^{(i)}) + \frac{C_{(-1)}}{N_B} \sum_{i=1}^{N_B} (w_{(-1)}^T \phi(x_{(+1)}^{(i)}) + b_{(-1)})\phi(x_{(-1)}^{(i)}) \quad (17)$$

The data classification module 112 may further proceed and evaluate derivatives of the error functions E(+1) and E(−1) with respect to the biases. The same may be represented through the following equations:

$$\frac{\partial E_{(+1)}}{\partial b_{(+1)}} = \frac{1}{N_B} \sum_{i=1}^{N_B} (t_{(i)} - y_{(i)})(1 - y_{(i)}^2) + \frac{C_{(+1)}}{N_A} \sum_{i=1}^{N_A} (w_{(+1)}^T \phi(x_{(+1)}^{(i)}) + b_{(+1)}) \quad (18)$$

$$\frac{\partial E_{(-1)}}{\partial b_{(-1)}} = \frac{1}{N_A} \sum_{i=1}^{N_A} (t_{(i)} - y_{(i)})(1 - y_{(i)}^2) + \frac{C_{(-1)}}{N_B} \sum_{i=1}^{N_B} (w_{(-1)}^T \phi(x_{(-1)}^{(i)}) + b_{(-1)}) \quad (19)$$

Once the derivatives are obtained, the data classification module 112 updates the weights and bias of the hyperplane across the iterations until these hyperplane parameters converge. In one example, the data classification module 112 predicts on a test point in the following manner. First, the point is mapped to the space $\varphi(\cdot)$ through the hidden or intermediate layers of the twin neural network, such as that depicted by FIG. 2. Continuing with the present example, in the output layer the label y is predicted using the following expression:

$$y = \begin{cases} +1 & : \frac{w_{(+1)}^T \phi(x) + b_{(+1)}}{\|w_{(+1)}\|} \leq \frac{w_{(-1)}^T \phi(x) + b_{(-1)}}{\|w_{(-1)}\|} \\ -1 & : \text{otherwise} \end{cases} \quad (20)$$

The VC dimension $\gamma$ of a classifier with margin $d > d_{min}$ is bounded by the following:

$$\gamma \leq 1 + \min\left(\frac{R^2}{d_{min}^2}, n\right) \quad (21)$$

where R denotes the radius of the smallest sphere enclosing all the training samples. As can be seen from above, the data classification module 112 even for the twin neural network minimizes a sum of a term that is related to neural network, and another that depends on the empirical error. These and other aspects are further described in relation the method steps, and further illustrative examples on varying datasets.

Figure 3:
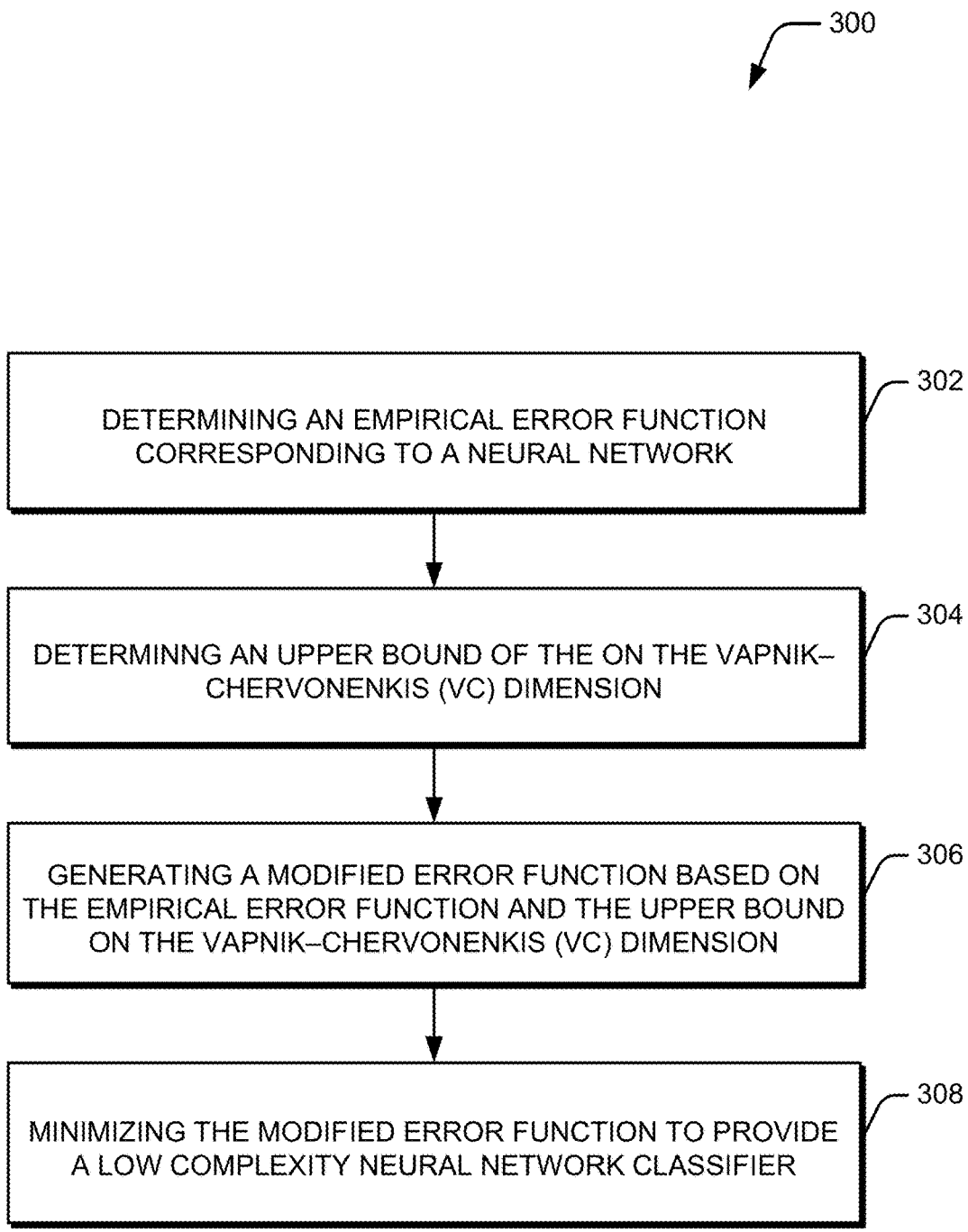
FIG. 3 depicts an example method for classifying training samples with minimal error using a low complexity neural network classifier.

FIG. 3 illustrate example method 300, respectively, to for classifying training samples with minimal error, according to an implementation of the present subject matter. The order in which the methods are described is not intended to be construed as a limitation, and any number of the described method blocks may be combined in any order to implement the aforementioned methods, or an alternative method. Furthermore, method 300 may be implemented by processing resource or computing device(s) through any suitable hardware, non-transitory machine-readable instructions, or combination thereof.

It may also be understood that method 300 may be performed by programmed computing devices, such as system 102 as depicted in FIG. 1. Furthermore, the method 300 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. The method 300 are described below with reference to system 102 as described above; other suitable systems for the execution of these methods may also be utilized. Additionally, implementation of these methods is not limited to such examples.

At block 302, an empirical error function corresponding to a neural network is determined. In one example, the empirical error function is determined by the data classification module 112. The empirical error function is based on the net input provided to the output node of the neural network under consideration.

At block 304, an upper bound of the on the Vapnik-Chervonenkis (VC) dimension is determined. In one example, the data classification module 112 may further determine the upper bound of the VC dimension γ of the classifier formed by the output neuron acting on the inputs.

At block 306, a modified error function is generated based on the empirical error function and the upper bound on the Vapnik-Chervonenkis (VC) dimension. In one example, the data classification module 112 obtains a modified error function 118 based on the empirical error function corresponding to the neural network and the upper bound on the VC dimension.

At block 308, the modified error function is minimized to provide a low complexity neural network classifier. In one example, the data classification module 112 generates the low complexity neural network classifier by minimizing the modified error function.

The following portions of the present description provide various experimental implementations for classifying training samples with minimal error using a low complexity neural network classifier. It should be noted that the present examples are only illustrative and should not be construed as limiting the scope of the present subject matter. Other implementations may also be present without deviating from the scope of the present subject matter.

ILLUSTRATIVE EXAMPLES

As described previously, the data classification module 112 may generate the low complexity neural network classifier (referred to as LCNN). In the present example, the LCNN is coded using the L-BFGS algorithm with adaptive learning rate. The L-BFGS uses a Hessian approximation based on the gradient. The performance of the LCNN was assessed on a number of standard benchmark datasets. All implementations may be carried out on conventional computing device.

The LCNN may be evaluated on three different classification settings that closely resemble real world classification tasks. For a general setting, the performance of the LCNN may be evaluated on 32 benchmark datasets from the UCI Machine Learning repository. For face recognition, the ORL dataset may be used. For a deep learning setting with stacked sparse autoencoders, the original MNIST dataset and its variations for handwritten digit classification may be used; and rectangle and rectangle-image datasets may also be used for shape classification task.

The LCNN may be tested on 32 benchmark datasets drawn from the UCI machine learning repository, which includes two class and multi-class datasets. The K-Nearest Neighbor (KNN) imputation method may be used for handling missing attribute values, as it is robust to bias between classes in the dataset. Accuracies may be obtained using a standard 5-fold cross validation methodology. This process may be repeated a predefined number of time times to remove the effect of randomization. In one example, the data is processes at least 10 times.

Further, input features were scaled to lie between −1 and 1. Target set values were kept at +1 and −1 for the respective classes. For multi-class problems, a one versus rest approach may be used, with as many output layer neurons as the number of classes. For the UCI datasets, an LCNN with one hidden layer may be employed. The number of neurons in the hidden layer and the value of C were optimized by using a grid search. The performance of the LCNN may be compared with other state-of-the-art algorithms, namely the SVM with a linear and a RBF kernel, and Regularized Feed-forward Neural Networks (RFNNs). Algorithms may be compared with regard to accuracies on the test set; a fivefold cross validation methodology may be used. The various approaches along with their respective parameters is provided in Table 1 below:

TABLE I

| Summary of methods with which LCNN is compared | | |
|---|---|---|
| S. No. | Method | Hyperparameters |
| 1. | LCNN | C (Complexity Term), no. of hidden layer neurons |
| 2. | RFNNs | Regularization Parameter, no. of hidden layer neurons |
| 3. | SVM-Lin (Support Vector Machine with Linear Kernel) | C (weight for classification error term), also termed as the soft margin term |
| 4. | SVM-Ker (Support Vector Machine with Nonlinear Kernel) | C (weight for classification error term), also termed as the soft margin term, and kernel hyper-parameters, such as the width of the Gaussian when a Gaussian or Radial Basis Function kernel is used. |

The tests results of the above example on the appropriate datasets are obtained. Table II shows the test accuracies obtained by all the algorithms on the UCI Benchmark datasets. Results are shown as Mean Accuracy±Standard Deviation for each dataset. The best performing models in terms of accuracy and standard deviation are indicated in boldface. From Table II, it can be inferred that performance of LCNN is better that other algorithms for most of the datasets.

TABLE II

Classification accuracies on UCI datasets

|   | Dataset | SVM linear | SVM kernel | RFNN | LCNN |
|---|---|---|---|---|---|
| 1 | Pimaindians (768 × 4 × 2) | 76.5 ± 2.99 | 76.81 ± 3.96 | 76.11 ± 3.60 | 77.97 ± 2.69 |
| 2 | Heartstat (270 × 13 × 2) | 83.33 ± 4.71 | 83.33 ± 5.39 | 81.01 ± 4.82 | 85.55 ± 4.61 |
| 3 | Haberman (306 × 3 × 2) | 72.22 ± 1.17 | 72.32 ± 1.18 | 73.11 ± 2.71 | 75.46 ± 1.13 |
| 4 | Hepatitis (155 × 19 × 2) | 80.00 ± 6.04 | 82.64 ± 4.60 | 81.11 ± 6.29 | 85.16 ± 7.43 |
| 5 | Ionosphere (351 × 34 × 2) | 87.82 ± 2.11 | 88.87 ± 2.74 | 86.21 ± 4.28 | 92.87 ± 2.86 |
| 6 | Transfusion (748 × 4 × 2) | 76.20 ± 0.27 | 76.60 ± 0.42 | 76.01 ± 1.57 | 79.35 ± 1.89 |
| 7 | ECG (132 × 12 × 2) | 84.90 ± 5.81 | 85.65 ± 5.37 | 86.25 ± 6.64 | 91.22 ± 6.20 |
| 8 | Fertility (100 × 9 × 2) | 85.03 ± 6.03 | 88.03 ± 2.46 | 87.91 ± 6.51 | 88.93 ± 2.46 |
| 9 | Australian (690 × 14 × 2) | 85.50 ± 4.04 | 85.64 ± 4.24 | 85.24 ± 3.52 | 87.97 ± 3.10 |
| 10 | Credit Approval (690 × 15 × 2) | 69.56 ± 0 | 69.56 ± 0 | 68.14 ± 0.94 | 70.3 ± 0 |
| 11 | Mamm-masses (961 × 5 × 2) | 78.87 ± 2.14 | 79.91 ± 3.02 | 77.96 ± 2.00 | 81.16 ± 3.00 |
| 12 | German Credit (1000 × 20 × 2) | 74.1 ± 2.77 | 73.60 ± 1.19 | 75.8 ± 2.88 | 76.6 ± 2.39 |
| 13 | Planning Relax (182 × 12 × 2) | 71.44 ± 1.06 | 71.44 ± 1.06 | 71.05 ± 3.54 | 71.99 ± 1.94 |
| 14 | SONAR (208 × 60 × 2) | 76.02 ± 6.70 | 78.38 ± 7.67 | 86.62 ± 6.90 | 87.10 ± 5.73 |
| 15 | House Votes (435 × 16 × 2) | 95.88 ± 1.90 | 96.10 ± 1.87 | 95.56 ± 1.56 | 97.02 ± 1.00 |
| 16 | Balance (576 × 4 × 2) | 94.61 ± 1.68 | 98.43 ± 1.13 | 97.39 ± 2.39 | 98.78 ± 0.98 |
| 17 | Wholesale (440 × 7 × 2) | 89.54 ± 1.88 | 87.27 ± 2.81 | 91.07 ± 2.25 | 92.05 ± 0.64 |
| 18 | Glass (214 × 10 × 6) | 92.11 ± 3.08 | 93.10 ± 1.85 | 92.42 ± 2.27 | 96.21 ± 3.22 |
| 19 | Seed (210 × 7 × 3) | 92.71 ± 4.65 | 95.00 ± 5.41 | 93.14 ± 10.0 | 95.16 ± 1.39 |
| 20 | Blogger (100 × 5 × 2) | 70.93 ± 12.4 | 80.10 ± 8.07 | 79.50 ± 9.35 | 80.1 ± 8.07 |
| 21 | IPLD (583 × 10 × 2) | 71.35 ± 0.39 | 71.35 ± 0.39 | 71.05 ± 4.20 | 73.85 ± 3.77 |
| 22 | Teaching Assistant (151 × 5 × 3) | 64.47 ± 12.0 | 68.63 ± 6.84 | 70.68 ± 8.53 | 74.68 ± 5.42 |
| 23 | Iris (150 × 4 × 3) | 96.44 ± 3.47 | 97.26 ± 2.87 | 97.33 ± 2.42 | 97.33 ± 0.94 |
| 24 | Zoo (101 × 16 × 7) | 96.4 ± 4.50 | 90.78 ± 5.65 | 96.10 ± 1.80 | 97.94 ± 1.74 |
| 25 | Letter (20000 × 16 × 26) | 84.21 ± 0.89 | 82.23 ± 1.05 | 79.93 ± 3.01 | 87.08 ± 4.98 |
| 26 | Hayes Roth (160 × 5 × 3) | 60.43 ± 10 | 60.40 ± 5 | 75.23 ± 3.47 | 75.18 ± 2.48 |
| 27 | Breast Cancer Wisconsin (699 × 9 × 2)* | 96.6 ± 1.9 | 96.5 ± 1.3 | 94.83 ± 2.07 | 96.83 ± 0.77 |
| 28 | Heart Spectf (267 × 44 × 2) | 78.89 ± 1.02 | 79.16 ± 1.23 | 79.03 ± 1.17 | 81.79 ± 2.01 |
| 29 | Horse (368 × 27 × 2)* | 84.01 ± 5.76 | 84.52 ± 3.76 | 83.84 ± 1.49 | 86.83 ± 1.97 |
| 30 | Sensorless Drive (58509 × 49 × 11) | 90.01 ± 0.34 | 91.37 ± 0.75 | 95.35 ± 3.49 | 98.98 ± 1.07 |
| 31 | MiniBooNE (130064 × 50 × 2) | 85.71 ± 2.49 | 86.11 ± 3.12 | 85.35 ± 3.49 | 89.98 ± 1.07 |

Table III as shown below compares the training times of the LCNN against the other algorithms. This comparison is significant in order to establish the scalability of the LCNN for large data sets. Times have been indicated as mean±standard deviation, measured across the training folds of the respective datasets. The significant entries in the table are the very large datasets (rows 30 and 31), which clearly indicate that the LCNN scales well for large datasets.

TABLE III

Training time for UCI datasets

| S. no | Dataset (samples × features × classes) | SVM linear | SVM kernel | RFNN | LCNN |
|---|---|---|---|---|---|
| 1 | Pimaindians (768 × 4 × 2) | 0.021 ± 0.13 | 0.025 ± 0.006 | 0.18 ± 0.03 | 0.169 ± 0.07% |
| 2 | Heartstat (270 × 13 × 2) | 0.08 ± 0.002 | 0.12 ± 0.005 | 0.17 ± 0.08 | 0.14 ± 0.007% |
| 3 | Haberman (306 × 3 × 2) | 0.002 ± 0.004 | 0.004 ± 0.0008 | 0.12 ± 0.001 | 0.14 ± 0.01% |
| 4 | Hepatitis (155 × 19 × 2) | 0.008 ± 0.12 | 0.009 ± 0.006 | 0.14 ± 0.009 | 0.13 ± 0.01% |
| 5 | Ionosphere (351 × 34 × 2) | 0.01 ± 0.009 | 0.018 ± 0.009 | 0.17 ± 0.12 | 0.14 ± 0.005% |
| 6 | Transfusion (748 × 4 × 2) | 0.01 ± 0.002 | 0.022 ± 0.001 | 0.14 ± 0.01 | 0.12 ± 0.007% |
| 7 | ECG (132 × 12 × 2) | 0.007 ± 0.006 | 0.004 ± 0.005 | 0.16 ± 0.01 | 0.14 ± 0.03% |
| 8 | Fertility (100 × 9 × 2) | 0.007 ± 0.001 | 0.0084 ± 0.002 | 0.15 ± 6.51 | 0.16 ± 0.009% |
| 9 | Australian (690 × 14 × 2) | 0.03 ± 0.09 | 0.02 ± 0.007 | 0.16 ± 0.12 | 0.14 ± 0.01% |
| 10 | Credit Approval (690 × 15 × 2) | 0.03 ± 0.009 | 0.04 ± 0.005 | 0.13 ± 0.006 | 0.13 ± 0.005% |
| 11 | Mamm-masses (961 × 5 × 2) | 0.08 ± 0.004 | 0.09 ± 0.001 | 0.18 ± 0.04 | 0.15 ± 0.01% |
| 12 | German Credit (1000 × 20 × 2) | 0.07 ± 0.02 | 0.09 ± 0.01 | 0.16 ± 0.02 | 0.15 ± 0.01% |
| 13 | Planning Relax (182 × 12 × 2) | 0.016 ± 0.01 | 0.03 ± 0.004 | 0.13 ± 0.006 | 0.12 ± 0.004% |
| 14 | SONAR (208 × 60 × 2) | 0.08 ± 0.004 | 0.097 ± 0.005 | 0.16 ± 0.012 | 0.15 ± 0.02% |
| 15 | House Votes (435 × 16 × 2) | 0.008 ± 0.004 | 0.012 ± 0.03 | 0.14 ± 0.017 | 0.13 ± 0.007% |
| 16 | Balance (576 × 4 × 2) | 0.007 ± 0.001 | 0.009 ± 0.0012 | 0.16 ± 0.0.009 | 0.14 ± 0.001% |
| 17 | Wholesale (440 × 7 × 2) | 0.007 ± 0.0008 | 0.009 ± 0.0001 | 0.19 ± 0.14 | 0.18 ± 0.07% |
| 18 | Glass (214 × 10 × 6) | 0.003 ± 0.001 | 0.007 ± 0.0013 | 0.32 ± 0.01 | 0.30 ± 0.02% |
| 19 | Seed (210 × 7 × 3) | 0.001 ± 0.00001 | 0.002 ± 0.0003 | 0.16 ± 0.017 | 0.18 ± 0.02% |
| 20 | Blogger (100 × 5 × 2) | 0.001 ± 0.0002 | 0.001 ± 0.0003 | 0.15 ± 0.05 | 0.14 ± 0.02% |
| 21 | IPLD (583 × 10 × 2) | 0.01 ± 0.0003 | 0.02 ± 0.00001 | 0.17 ± 0.06 | 0.17 ± 0.05% |
| 22 | Teaching Assistant (151 × 5 × 3) | 0.002 ± 0.0005 | 0.003 ± 0.0008 | 0.39 ± 0.02 | 0.35 ± 0.03% |
| 23 | Iris (150 × 4 × 3) | 0.01 ± 0.001 | 0.013 ± 0.003 | 0.17 ± 0.01 | 0.15 ± 0.03% |
| 24 | Zoo (101 × 16 × 7) | 0.02 ± 0.0001 | 0.03 ± 0.004 | 0.18 ± 0.01 | 0.18 ± 0.01% |
| 25 | Letter (20000 × 16 × 26) | 11.5 ± 0.05 | 21.09 ± 0.82 | 34.93 ± 4.21 | 27 ± 3.22% |
| 26 | Hayes Roth (160 × 5 × 3) | 0.008 ± 0.00001 | 0.001 ± 0.0005 | 0.23 ± 0.09 | 0.19 ± 0.03% |
| 27 | Breast Cancer Wisconsin (699 × 9 × 2)* | 0.03 ± 0.0009 | 0.05 ± 0.0005 | 0.32 ± 0.08 | 0.29 ± 0.06% |
| 28 | Heart Spectf (267 × 44 × 2) | 0.01 ± 0.0002 | 0.01 ± 0.0008 | 0.23 ± 0.04 | 0.18 ± 0.01% |
| 29 | Horse (368 × 27 × 2)* | 0.012 ± 0.001 | 0.012 ± 0.001 | 0.18 ± 0.008 | 0.12 ± 0.002% |
| 30 | Sensorless Drive (58509 × 49 × 11) | 135 ± 3.28 | 404 ± 8.91 | 127 ± 4.12 | 119 ± 2.16} % |
| 31 | MiniBooNE (130064 × 50 × 2) | 1595 ± 24 | 2896 ± 35 | 227 ± 8.32 | 205 ± 3.32} % |

Further, the training time and classification accuracy of the LCNN vis-à-vis other approaches may be compared with increasing number of samples for the MiniBooNE dataset.

Figure 4:
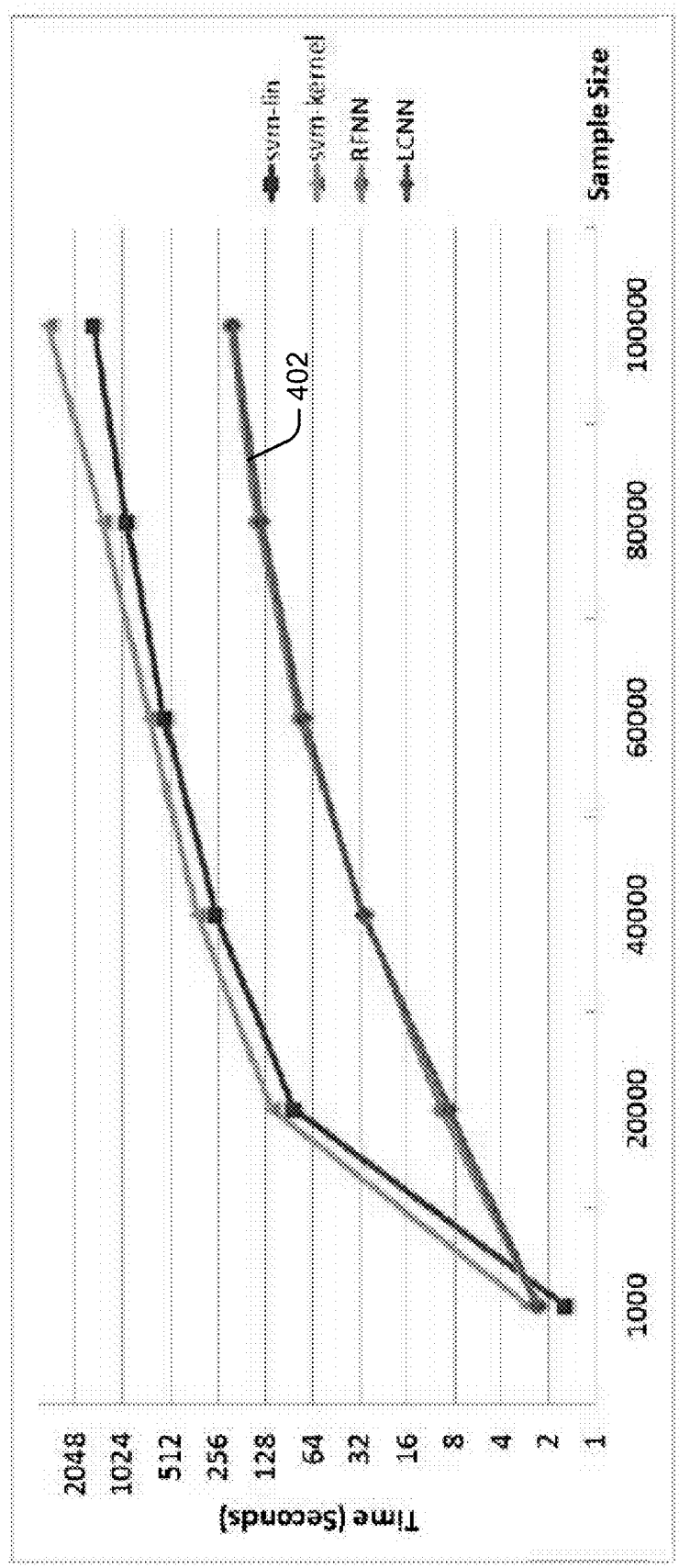
FIG. 4 illustrates a graphical plot between the training time and number of training samples for a system for classifying training samples with minimal error, as per an example of the present subject matter.

FIG. 4 depicts the time plotted along the vertical axis, while the increasing numbers of samples are shown along the horizontal axis to show the variations in training times across different approaches. It may be noted here that of the 130,064 samples of the MiniBooNE dataset, 30,064 have been taken for testing and the scale-up for the LCNN has been shown for various training set sizes (up to 100,000 samples). The time taken by the LCNN is significantly lower than that of linear/kernel SVMs. The time taken by the LCNN is close to the time taken by RFNNs, thereby affirming the scalability of the LCNN as compared to other approaches.

Figure 5:
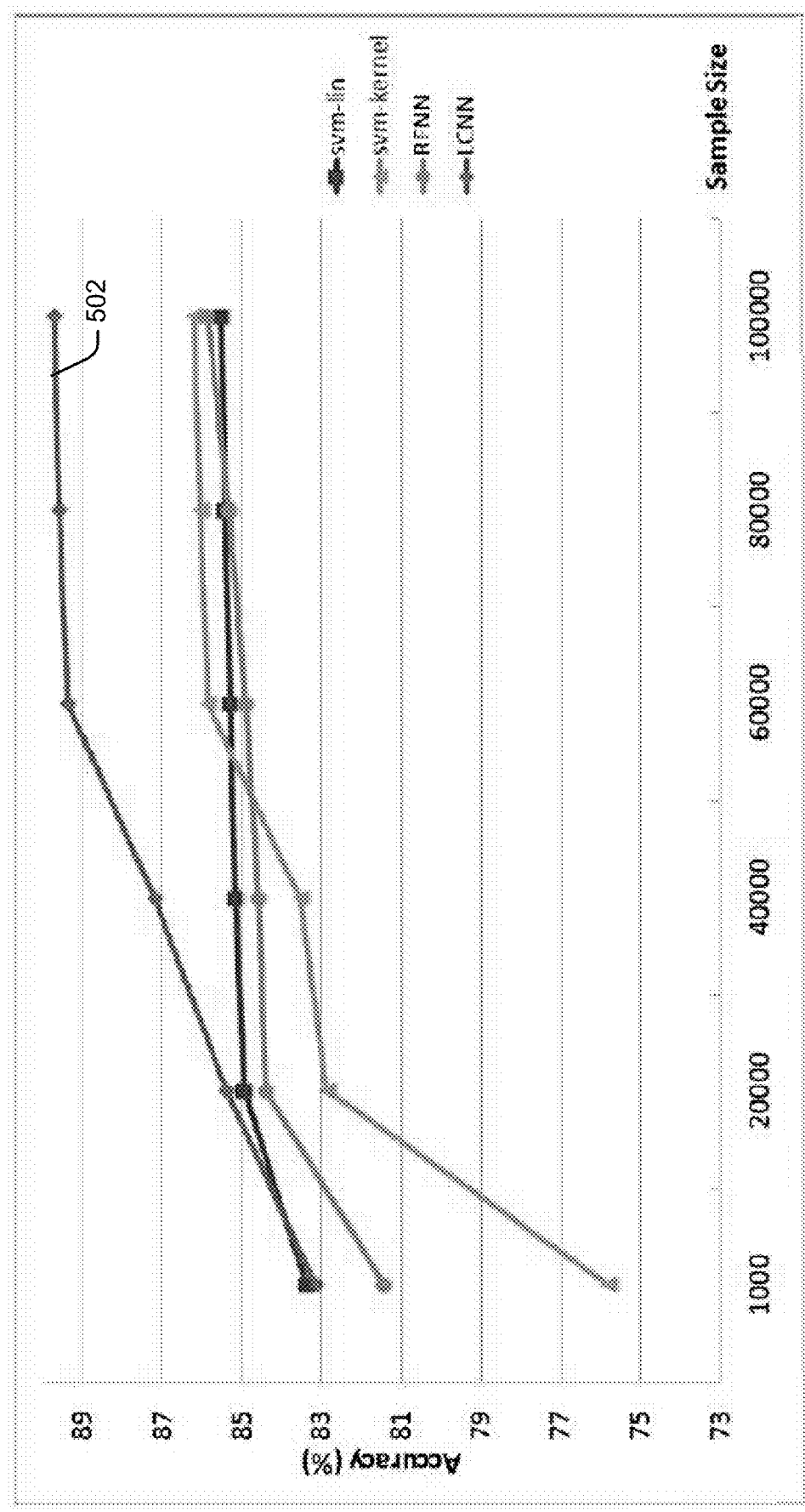
FIG. 5 illustrates depicts variation between testing accuracy and number of training samples for a system for classifying training samples with minimal error, as per an example of the present subject matter.

FIG. 5 shows the testing accuracy varies as the training set size is increased up to 100,000 samples. The graph indicates that the LCNN generalizes better, and attains the maximum early. This demonstrates that it is able to learn a good representation from small amounts of the data. The superior generalization ability of the LCNN stems from the minimization of its complexity, as measured by the VC dimension.

The approaches as described above have been further implemented for ORL Face Database. As would be understood, the ORL Face database is a popular face recognition dataset that has been used for benchmarking several classifier models. It consists of ten different images of each of 40 distinct subjects with varying lighting conditions, facial expressions (open/closed eyes, smiling/not smiling) and facial details (glasses/no glasses). All the images were taken against a dark background with the subjects in an upright, frontal position. For pre-processing the images of the ORL face database, a histogram equalization may be used. The performance of the LCNN on the ORL Face database may be compared against conventional RFNNs and the proximal tensor SVM. The results are shown in Table IV. In the present example, three cases are selected for distribution of the train-test samples of each class for generating the results. These include: 8 training and 2 test samples; 5 training and 5 test samples; and 1 training and 9 test samples. From the results, it is evident that the LCNN outperforms other approaches in all three scenarios.

TABLE IV

Results on ORL Face Database

| Dataset | Per class images | LCNN accuracy | RFNN accuracy | Proximal tensor SVM accuracy |
|---|---|---|---|---|
| ORL Face | 8 Train/2 Test | 97.75 | 93.75 | 95 |
| | 5 Train/5 Test | 93.75 | 89.25 | 91.25 |
| | 1 Train/9 Test | 60.1 | 51.5 | 51.5 |

In another example, the present approaches were implemented for MNIST dataset. MNIST dataset is a widely popular handwritten image digit recognition benchmark, on which many deep learning models based have been evaluated. The available dataset provides an infinite supply of digit images derived from the MNIST dataset using pseudo-random deformations and translations. The dataset allows to study the effect of increasing the number of training samples for the digit recognition task. In one example, a part of the infinite MNIST dataset with 200,000 and 400,000 images is considered to evaluate the performance of LCNN implementation on sparse autoencoders. The sparse autoencoders based on the LCNN outperform those based on RFNNs. This is also true for the rectangles and rectangle-images dataset, which requires a learning algorithm to recognize whether a rectangle contained in an image has a bigger width or length. The rectangle can be situated anywhere in the 28×28 pixel image. Table V indicates that the LCNN provides good generalization for large datasets on a consistent basis. The last result in the table also shows that the LCNN generalizes well from small samples of the dataset.

TABLE VI

Performance comparison of Sparse Autoencoders on MNIST and Rectangle dataset using LCNN and RFNNs

| S. No | Dataset | Size × Features | Topology | LCNN based sparse auto-encoders | Sparse Auto-encoders with reg. |
|---|---|---|---|---|---|
| 1 | MNIST | 60000 × 784 (Training set) 10000 × 784 (Test set) | Stacked sparse autoencoder One hidden layer Pre training + fine tuning (mse) | 98.10% | 97.90% |
| 2 | Infinite MNIST (Part) | 200000 × 784 (Training set) [Generated from Inifinite MNIST] 10000 × 784 (Test set) | Stacked sparse autoencoder One hidden layer Pre training + fine tuning (mse) | 98.40% | 98.10% |
| 3 | Infinite MNIST (Part) | 400000 × 768 (Training set) [Generated from Inifinite MNIST] 10000 × 784 (Test set) | Stacked sparse autoencoder One hidden layer Pre training + fine tuning (mse) | 98.50% | 98.19% |
| 4 | MNIST | 60000 × 784 (Training set) 10000 × 784 (Test set) | Stacked sparse autoencoder Two hidden layers Pre training + fine tuning (mse) | 98.20% | 97.80% |
| 5 | Infinite MNIST (Part) | 400000 × 768 (Training set) [Generated from Inifinite MNIST] 10000 × 784 (Test set) | Stacked sparse autoencoder Two hidden layers Pre training + fine tuning (mse) | 98.66% | 98.11% |
| 6 | Rectangle | 12000 × 768 (Training set) 50000 × 784 (Test set) | Stacked sparse autoencoder One hidden layer Pre training + fine tuning (mse) | 97.32% | 95.91% |
| 7 | Rectangle Image | 12000 × 784 (Training set) 50000 × 784 (Test set) | Stacked sparse autoencoder One hidden layer Pre training + fine tuning (mse) | 77.21% | 75.97% |

Figure 6A:
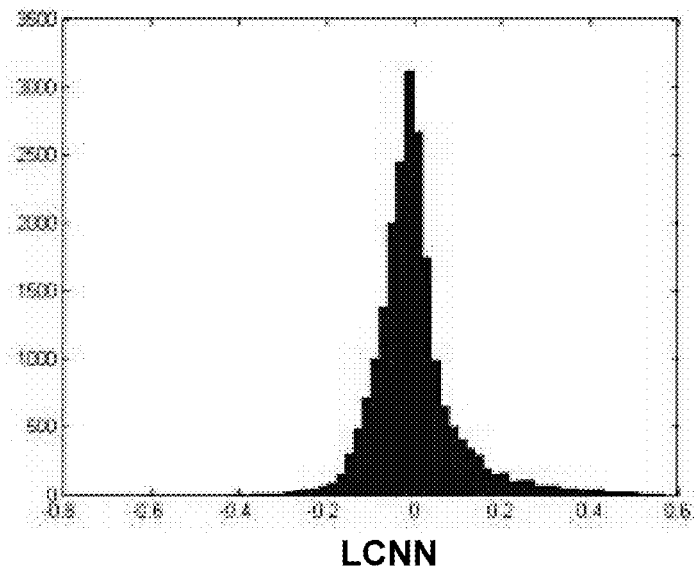
FIG. 6A illustrates a histogram of the weight values for sparse autoencoders based on the LCNN for a system for classifying training samples with minimal error, as per an example of the present subject matter.
Figure 6B:
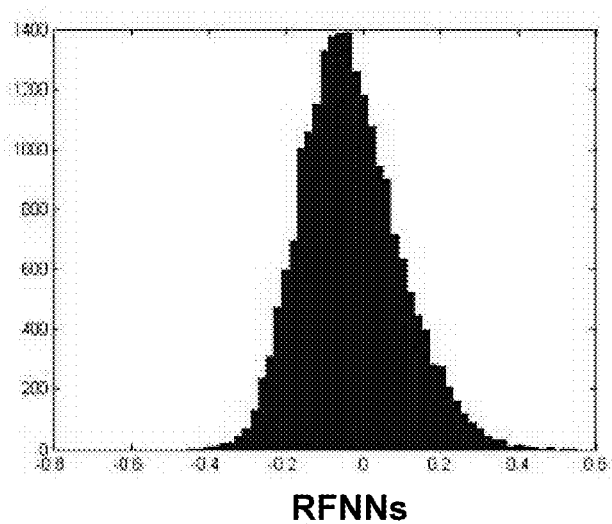
FIG. 6B illustrates a histogram of the weight values for sparse autoencoders based on the RFNNs for a system for classifying training samples with minimal error, as per an example of the present subject matter.

FIGS. 6A and 6B show histograms of the weight values for sparse autoencoders based on the LCNN and RFNNs, respectively. The LCNN weight distribution is far narrower, and displays a sharper peak. This implies that a significantly larger number of the LCNN weights are zero or nearly zero. Sparsity in the weights is well known to correlate with the VC dimension and model complexity. The upper bounds on VC dimension of two layer neural networks are derived with sigmoidal activation function as $O(w \log(wD))$, and where the inputs lie in the range $\{-D, D\}$. The VC dimension for 3-layer networks is $(F(w \log w))$, where w is the number of weights. The sparse representations learnt by the LCNN support our claim that the modified objective function leads to networks with a smaller VC dimension. It should be noted that the histograms thus depicted are only exemplary and should not be construed as a limitation.

Figure 7:
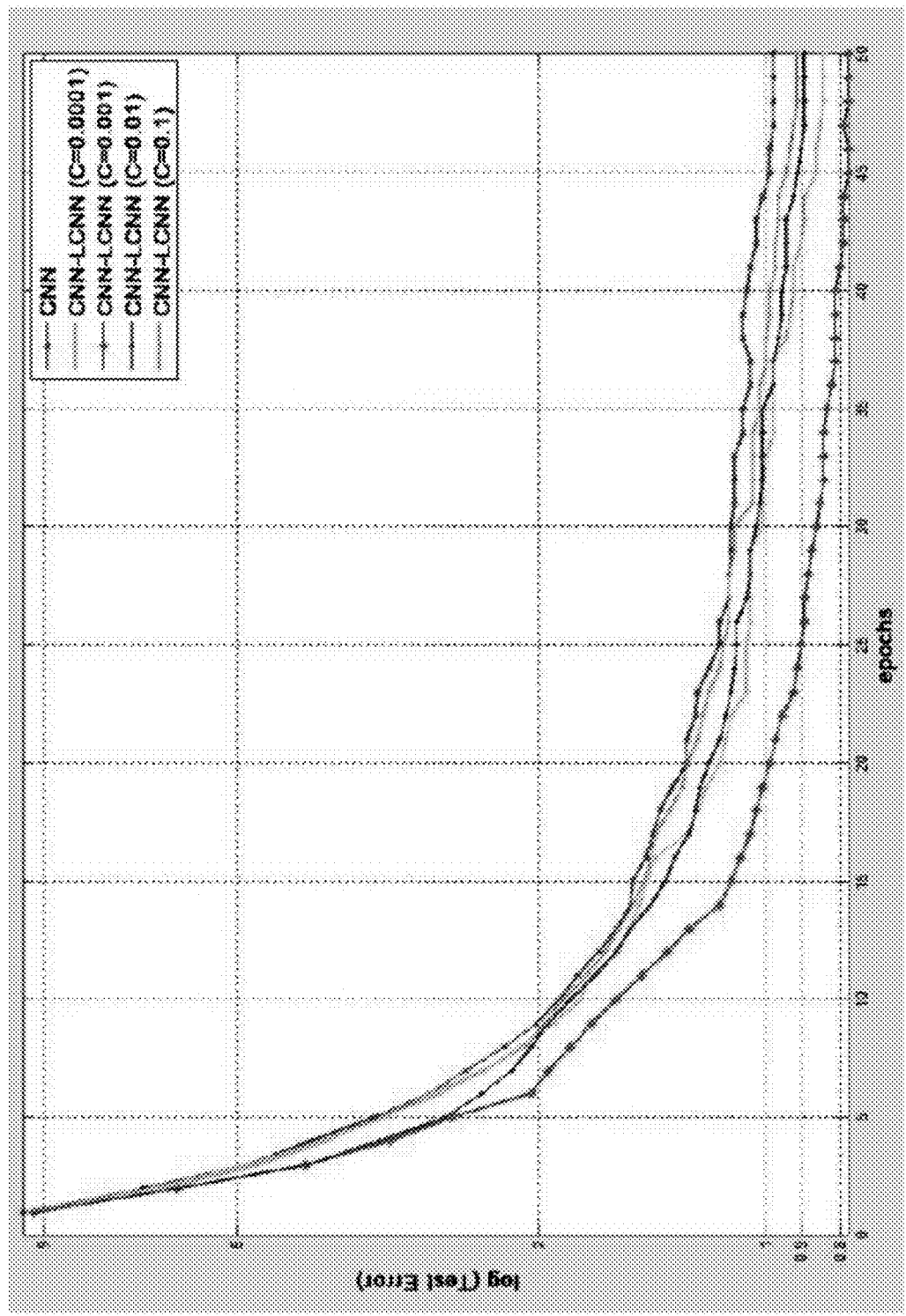
FIG. 7 illustrates a graphical representation of CNN-LCNN experiments for a system for classifying training samples with minimal error, as per an example of the present subject matter.

FIG. 7 illustrates a graphical representation of CNN-LCNN experiments, as per an implementation of the present subject matter. For the CNN-LCNN Experiments, the Dataset used is MNIST (i.e., Mixed National Institute of Standards and Technology) database. As would be understood, the MNIST database is a large database of handwritten digits that is commonly used for training various image processing systems. The database is also widely used for training and testing in the field of machine learning. It should be noted that the present example is provided in the context of the MNIST database. However, other database which may have been used for training machine learning may also be used without deviating from the scope of the present subject matter.

The various results obtained from the CNN-LCNN Experiments are present as follows:

| | CNN | CNN-LCNN $C = 10^{-4}$ | CNN-LCNN $C = 10^{-3}$ | CNN-LCNN $C = 10^{-2}$ | CNN-LCNN $C = 10^{-1}$ |
|---|---|---|---|---|---|
| Test Error | 0.98 | 0.84 | 0.78 | 0.89 | 0.91 |

The Architecture used for the CNN-LCNN Experiments may be featured as:
  LeNet (Two Convolutional Layers with Max-Pooling, Two fully connected layers)
  Number of kernels: 20 in first layer 50 in second layer
  Maxpooling Size=2×2
  Filter shape=5×5
  Softmax with complexity term in last layer
Further, the Learning Algorithm used for the CNN-LCNN Experiments may be featured as:
  Stochastic Gradient Descent (SGD) with minibatch
  Minibatch size: 500
  Learning rate: 0.1
  Total Epochs: 50

The various results obtained from the CNN-LCNN Experiments are present in the following table:

|  | CNN | CNN-LCNN $C = 10^{-4}$ | CNN-LCNN $C = 10^{-3}$ | CNN-LCNN $C = 10^{-2}$ | CNN-LCNN $C = 10^{-1}$ |
|---|---|---|---|---|---|
| Test Error | 0.98 | 0.84 | 0.78 | 0.89 | 0.91 |

Figure 8:
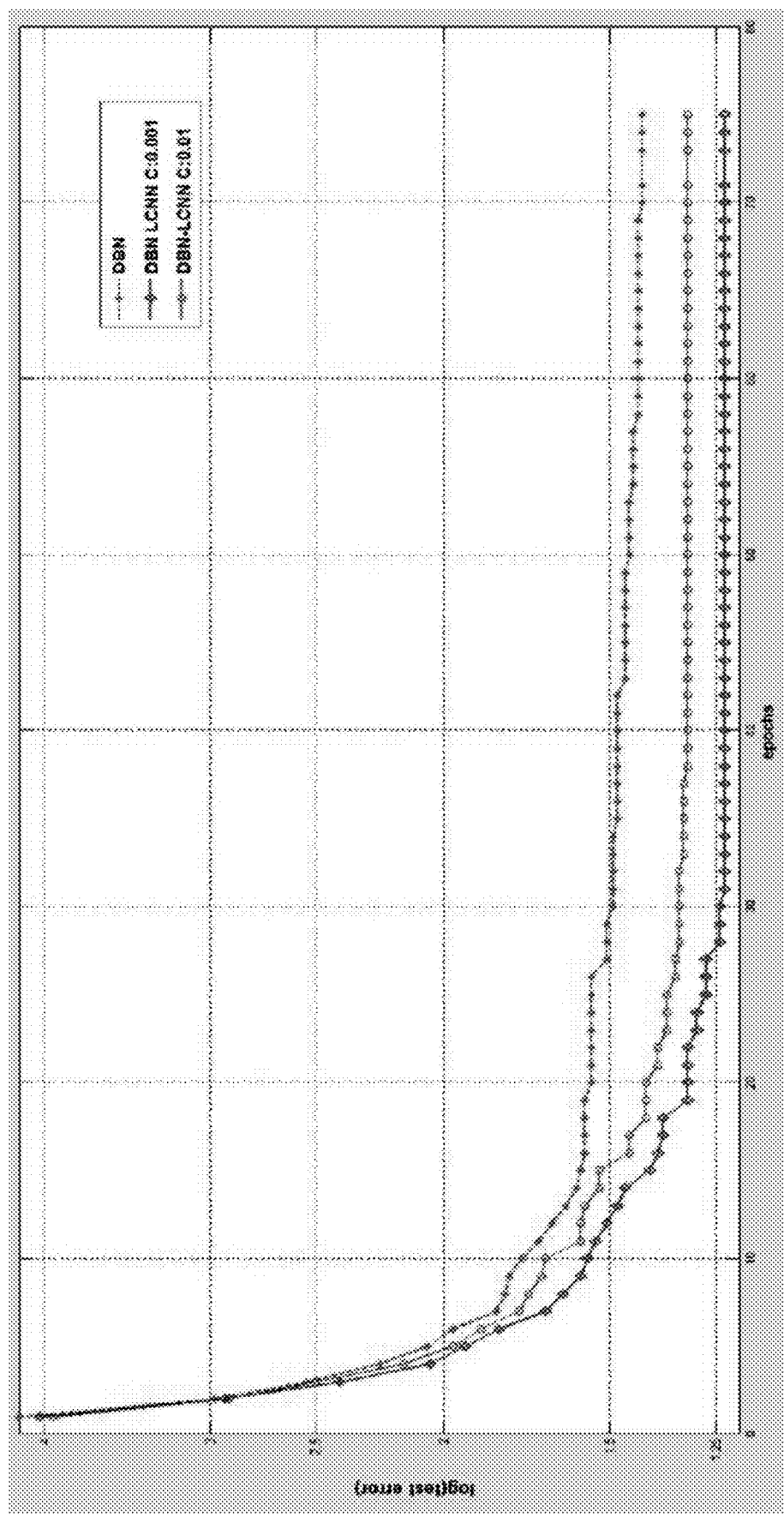
FIG. 8 illustrates a graphical representation of DBN-LCNN Experiments for a system for classifying training samples with minimal error, as per an example of the present subject matter.

FIG. 8 illustrates a graphical representation of DBN-LCNN Experiments, as per an implementation of the present subject matter. For the DBN-LCNN Experiments, the Dataset used is MNIST.

The Architecture used for the DBN-LCNN Experiments may be featured as:
   Stacked Restricted Bolteman Machine (Deep Belief Nets)
   Experimented with Multiple Numbers of hidden layer
   Softmax with complexity term in last layer Further, the Learning Algorithm used for the DBN-LCNN Experiments may be featured as:
   Greedy layerwise pretraining and finetuning SGD with minibatch
   Minibatch size: 10
   Learning rate pretraining: 0.01
   Learning rate finetuning: 0. 1
   Total Epochs pretraining: 80
   Total Epochs finetuning: 200

The various results obtained from the DBN-LCNN Experiments are present in the following table:

| S. No. | Architecture | Test Error: DBN | Test Error: DBN-LCNN $C = 10^{-3}$ |
|---|---|---|---|
| 1. | 784 × 800 × 10 | 1.45 | 1.31 |
| 2. | 784 × 800 × 400 × 10 | 1.42 | 1.23 |
| 3. | 784 × 800 × 400 × 200 × 10 | 1.57 | 1.21 |
| 4. | 784 ×800 × 400 × 200 × 100 × 10 | 1.62 | 1.39 |

| Size 784 × 800 × 400 × 10 | DBN | DBN-LCNN $C = 10^{-4}$ | DBN-LCNN $C = 10^{-4}$ | DBN-LCNN $C = 10^{-4}$ |
|---|---|---|---|---|
| Test Error | 1.42 | 1.29 | 1.23 | 1.31 |

Figure 9:
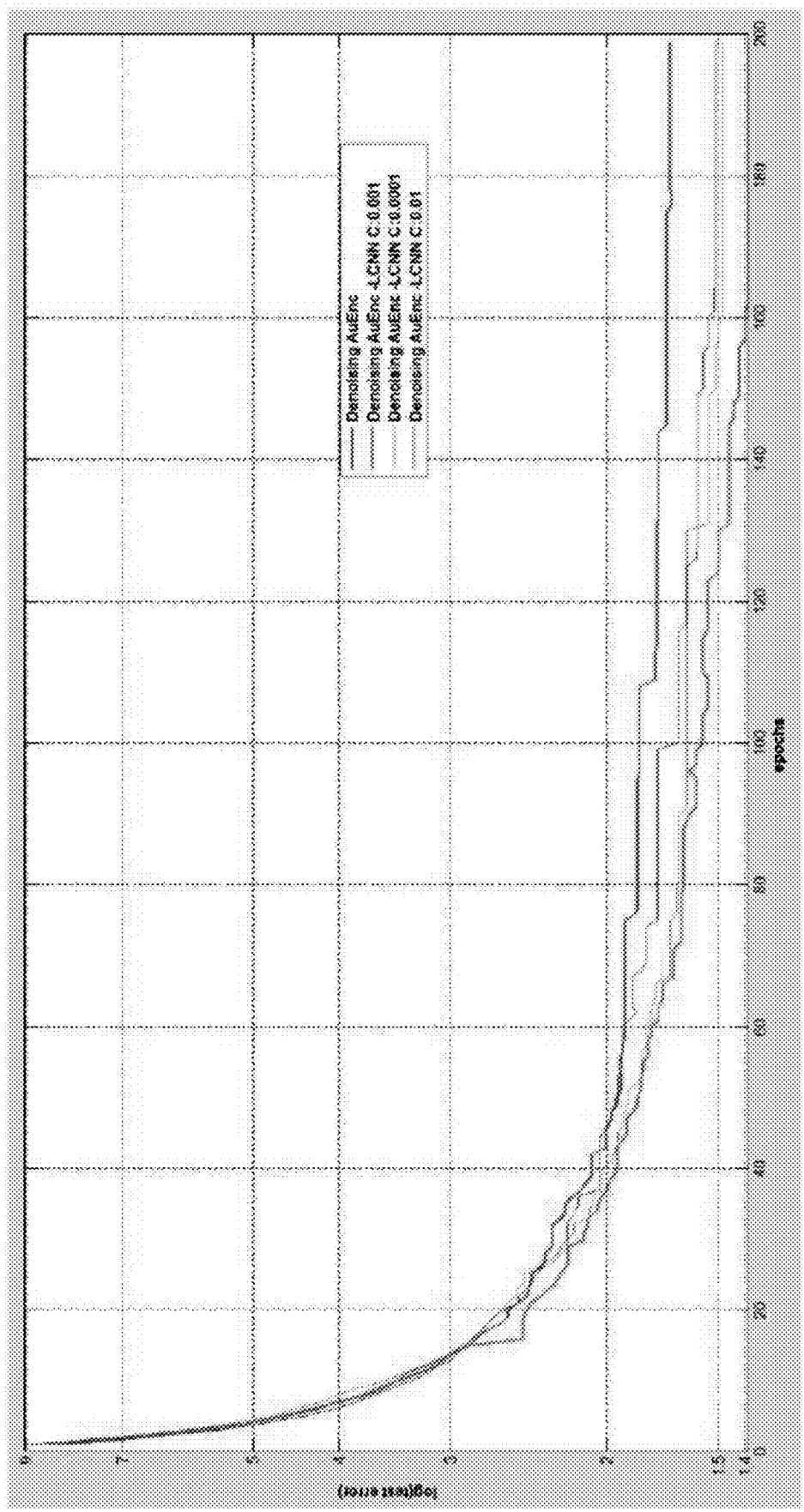
FIG. 9 illustrates a graphical representation of Denoising Autoencoder-LCNN Experiments for a system for classifying training samples with minimal error, as per an example of the present subject matter.

FIG. 9 illustrates a graphical representation of Denoising Autoencoder-LCNN Experiments, as per an implementation of the present subject matter. For the Denoising Autoencoder-LCNN Experiments, the Dataset used is MNIST.

The Architecture used for the Autoencoder-LCNN Experiments may be featured as:
   Stacked denoising autoencoders with different corruption levels & tied weights
   Experimented with Multiple Numbers of hidden layers
   Complexity term in layerwise pretraining
   Softmax with complexity term in last layer Further, the Learning Algorithm used for the Denoising Autoencoder-LCNN Experiments may be featured as:
   Layerwise pretraining and finetuning SGD with minibatch
   Minibatch size: 50
   Learning rate pretraining: 0.001
   Learning rate finetuning: 0.1
   Total Epochs pretraining: 20
   Total Epochs finetuning: 200
   Corruption rate: 0.1 in 1st HL, 0.2 in 2nd HL if any, 0.3 in 3rd HL if any The various results obtained from the Denoising Autoencoder-LCNN Experiments are present in the following table:

| S. No. | Architecture | Test Error: DeAE | Test Error: DeAE-LCNN Pretrain $C = 0.01$ finetune $C = 0.001$ |
|---|---|---|---|
| 1 | 784 1000 × 10 | 1.88 | 1.46 |
| 2 | 784 × 1000 × 400 × 10 | 1.70 | 1.39 |
| 3 | 784 × 1000 × 400 × 200 × 10 | 1.79 | 1.47 |

| 784 × 1000 × 400 × 10 | DeAE | DeAE LNCC $C = 0.0001$ | DeAE LCNN $C = 0.001$ | DeAe LCNN $C = 0.01$ |
|---|---|---|---|---|
| Test Error | 1.70 | 1.49 | 1.39 | 1.51 |

Further examples were implemented for a twin LCNN. The Twin LCNN may be tested on 20 benchmark datasets drawn from the UCI machine learning repository, which included two class and multi-class datasets. Input features were scaled to lie between −1 and 1. Target set values were kept at +1 and −1 for the respective classes. For multi-class problems, a one versus rest approach [3, pp. 182, 338] was used, with as many output layer neurons as the number of classes. A Twin LCNN with one hidden layer was employed for obtaining these results. The number of neurons in the hidden layer and the hyperparameters were optimized using a grid search. The K-Nearest Neighbor (KNN) imputation method was used for handling missing attribute values, as it is robust to bias between classes in the dataset. Accuracies were obtained using a standard 5-fold cross validation methodology. This process was repeated 10 times to remove the effect of randomization. The accuracies were compared with the standard SVM, Twin SVM and Regularized Feed-Forward Neural Networks (RFNN). The results are shown in Table VII, which clearly indicates the superior performance of the Twin LCNN compared to the SVM, Twin SVM and RFNN for 15 of the 20 datasets.

TABLE VII

Results on UCI datasets for the Twin NN

| S. No. | Dataset | Lin SVM | Ker SVM | RFNN | Twin-NN | LIN TWSVM | Ker TWSVM |
|---|---|---|---|---|---|---|---|
| 1 | Pimaindians (768 × 4) | 76.5 ± 2.99 | 77.33 ± 3.15 | 76.11 ± 3.60 | 78.19 ± 2.73 | 72.99 ± 6.00 | 75.91 ± 6.04 |
| 2 | Heartstat (270 × 13) | 83.33 ± 4.71 | 84.81 ± 3.56 | 81.01 ± 4.82 | 84.81 ± 2.74 | 83.11 ± 5.86 | 82.49 ± 3.42 |
| 3 | Haberman (306 × 3) | 72.22 ± 1.17 | 72.32 ± 1.18 | 73.11 ± 2.71 | 76.11 ± 4.54 | 73.53 ± 0.53 | 73.53 ± 0.53 |
| 4 | Hepatitis (155 × 19) | 80.00 ± 6.04 | 83.96 ± 4.05 | 81.11 ± 6.29 | 86.50 ± 5.98 | 79.11 ± 4.22 | 82.87 ± 1.71 |
| 5 | Ionosphere (351 × 34) | 87.82 ± 2.11 | 95.43 ± 2.35 | 86.21 ± 4.28 | 94.01 ± 1.87 | 85.55 ± 2.93 | 88.92 ± 1.52 |
| 6 | Transfusion 748 × 4) | 76.20 ± 0.27 | 76.60 ± 0.42 | 76.01 ± 1.57 | 78.07 ± 1.24 | 76.2 ± 0.20 | 76.60 ± 0.42 |

TABLE VII-continued

Results on UCI datasets for the Twin NN

| S. No. | Dataset | Lin SVM | Ker SVM | RFNN | Twin-NN | LIN TWSVM | Ker TWSVM |
|---|---|---|---|---|---|---|---|
| 7 | ECG (132 × 12) | 84.90 ± 5.81 | 87.20 ± 8.48 | 86.25 ± 6.64 | 91.73 ± 4.75 | 84.32 ± 3.18 | 84.88 ± 2.19 |
| 8 | Voting (435 × 16) | 93.69 ± 0.96 | 96.56 ± 1.13 | 94.47 ± 1.90 | 96.1 ± 1.5 | 93.11 ± 1.41 | 95.32 ± 1.11 |
| 9 | Fertility (100 × 9) | 85.03 ± 6.03 | 88.03 ± 2.46 | 87.91 ± 6.51 | 88.03 ± 2.46 | 65.95 ± 3.97 | 88.03 ± 2.46 |
| 10 | Australian (690 × 14) | 85.50 ± 4.04 | 86.51 ± 3.96 | 85.24 ± 3.52 | 87.97 ± 3.89 | 85.71 ± 4.11 | 85.67 ± 1.02 |
| 11 | CRX (690 × 15) | 69.56 ± 0 | 69.56 ± 0 | 68.14 ± 0.94 | 70.5 ± 1.62 | 65.56 ± 0.34 | 69.57 ± 0 |
| 12 | Mammmasses (961 × 5) | 78.87 ± 2.14 | 83.25 ± 3.77 | 77.96 ± 2.00 | 80.75 ± 2.37 | 78.51 ± 1.10 | 80.11 ± 1.23 |
| 13 | German (1000 × 20) | 74.1 ± 2.77 | 75.20 ± 2.58 | 75.8 ± 2.88 | 76.3 ± 1.35 | 71.99 ± 5.11 | 72.87 ± 4.71 |
| 14 | PLRX (182 × 12) | 71.44 ± 1.06 | 72.52 ± 0.44 | 71.05 ± 3.54 | 72.01 ± 1.94 | 72.08 ± 6.7 | 71.44 ± 1.06 |
| 15 | SONAR (208 × 60) | 76.02 ± 6.70 | 87.02 ± 6.47 | 86.62 ± 6.90 | 88.53 ± 5.27 | 76.11 ± 3.8 | 79.35 ± 7.11 |
| 16 | Housevotes (436 × 16) | 95.88 ± 1.90 | 96.56 ± 1.13 | 95.56 ± 1.56 | 97.02 ± 1.00 | 94.61 ± 1.21 | 96.32 ± 2.71 |
| 17 | Balance (576 × 4) | 94.61 ± 1.68 | 99.82 ± 0.38 | 97.39 ± 2.39 | 97.70 ± 1.93 | 94.99 ± 1.7 | 97.11 ± 2.42 |
| 18 | Blogger (100 × 5) | 70.93 ± 12.4 | 85.82 ± 8.48 | 79.50 ± 9.35 | 86.01 ± 4.22 | 72.11 ± 1.03 | 80.87 ± 1.11 |
| 19 | IPLD (583 × 10) | 71.35 ± 0.39 | 71.35 ± 0.39 | 71.05 ± 4.20 | 73.11 ± 1.64 | 69.97 ± 1.16 | 71.35 ± 0.48 |
| 20 | Heart Spectf (267 × 44) | 78.89 ± 1.02 | 79.16 ± 1.23 | 79.03 ± 1.17 | 83.34 ± 3.4 | 78.41 ± 2.17 | 79.51 ± 1.70 |

In addition, a comparative analysis of the performance of the Twin LCNN on UCI benchmark datasets with respect to other approaches in terms of p-values determined using Wilcoxon's signed ranks test is also presented. The values for the Wilcoxon signed ranks test. The Wilcoxon Signed-Ranks Test is a measure of the extent of statistical deviation in the results obtained by using an approach. A p-value less than 0.05 indicates that the results have a significant statistical difference with the results obtained using the reference approach, whereas p-values greater than 0.05 indicate non-significant statistical difference. The p-values for the approaches considered are shown in Table VIII, which clearly indicates that the Twin LCNN works better than the reference approaches.

TABLE VIII

Wilcoxon signed ranks test for the Twin NN

| S. No. | Algorithm | p value |
|---|---|---|
| 1 | Lin SVM | 8.18E-05 |
| 2 | Ker SVM | 3.80E-02 |
| 3 | RFNN | 8.84E-05 |
| 4 | Lin TWSVM | 1.01E-04 |
| 5 | Ker TWSVM | 1.31E094 |

The benefit obtained by using the Twin LCNN is its better generalization for unbalanced datasets. To establish this, we evaluate the Twin LCNN on several unbalanced datasets, which are summarized in Table IX. It may be noted here that the class imbalance has been introduced in these datasets by considering the multi-class datasets as separate binary datasets using one-v/s-rest approach. Thus for a dataset having N classes and M samples per class, we can in principle generate N datasets, each of which has a class ratio of M:(N−1)−M. Each of these possible datasets has been denoted as "GenN" suffixed to the dataset name in Table III, where N represents the corresponding class w.r.t. which imbalance has been induced in the dataset.

TABLE IX

Description of large unbalanced datasets, attributes are numeric (N) or categorical (C)

| S. No | Dataset Generated | Source | Area | Sample Ratio | No of Samples | Attributes |
|---|---|---|---|---|---|---|
| 1 | Abalone_Gen1 | UCI, link | Life | 1:9 | 391:3,786 | 1N, 7C |
| 2 | Letter_Gen | UCI | Computer | 1:26 | 734:19,266 | 16 |
| 3 | Yeast_Gen | UCI | Life | 1:28 | 51:1,433 | 8 |
| 4 | Abalone_Gen2 | UCI | Life | 1:129 | 32:4,145 | 8 |
| 5 | Coil_2000 | UCI KDD | Business | 1:15 | 586:9,236 | 85 |
| 6 | Car_Eval_Gen1 | UCI | Business | 1:25 | 65:1,663 | 6N, 21 C |
| 7 | Wine_Quality_Gen | UCI | Chemistry | 1:26 | 181:4,715 | 11C |
| 8 | Forest_CovType_Gen | UCI KDD | Nature | 1:210 | 2747:578,265 | 44N, 10C |
| 9 | Ozone_Level | UCI | Environment | 1:33 | 73:2,463 | 72C |
| 10 | Pen Digits_Gen | UCI | Computer | 1:9 | 1,055:9/937 | 16C |
| 11 | Spectrometer_Gen | UCI | Physics | 1:10 | 45:486 | 93C |
| 12 | Statlog_Gen | UCI | Nature | 1:9 | 626:5,809 | 36C |
| 13 | Libras_Gen | UCI | Physics | 1:14 | 24:336 | 90C |
| 14 | Optical Digits_Gen | UCI | Computer | 1:9 | 554:5,066 | 64C |
| 15 | Ecolo_Gen | UCI | Life | 1:8 | 35:301 | 7C |
| 16 | Car Evaluation_Gen2 | UCI | Business | 1:11 | 134:1,594 | 6N |
| 17 | US_Crime_Gen | UCI | Econoics | 1:12 | 150:1,844 | 122C |

TABLE IX-continued

Description of large unbalanced datasets, attributes are numeric (N) or categorical (C)

| S. No | Dataset Generated | Source | Area | Sample Ratio | No of Samples | Attributes |
|---|---|---|---|---|---|---|
| 18 | Protein_homology | KDD CUP 2004 | Biology | 1:111 | 1,296:144,455 | 74C |
| 19 | Scene_Gen | LibSVM Data | Nature | 1:12 | 177:2,230 | 294C |
| 20 | Solar_Flare_Gen | UCI | Nature | 1:19 | 68:1,321 | 10N |

Although implementations for training of the neural network are described, it is to be understood that the present subject matter is not necessarily limited to the specific features described. Rather, the specific features are disclosed as implementations.

I claim:

1. A method for training a neural network, the method comprising:
   determining, for the neural network, an upper bound on the Vapnik-Chervonenkis (VC) dimension;
   determining an empirical error function corresponding to the neural network;
   generating, for the neural network, a modified error function based on the upper bound on the VC dimension and the empirical error function; and
   training the neural network by minimizing the modified error function, wherein the modified error function is represented as:

$$E = \left[\frac{1}{2M}\sum_{i=1}^{M}(t_i - f(net_i))^2\right] + \frac{C}{2M}\sum_{i=1}^{M}(net^i)^2$$

wherein,
   M is the number of training patterns in the neural network;
   C represents a hyper-parameter; and
   $net^i$ represents net input to an output node of the neural network.

2. The method as claimed in claim 1, wherein the modified error function is based on a net input to an output node of the neural network.

3. A method for training a twin neural network comprising of a first neural network and a second neural network to be trained, the method comprising:
   determining number of training patterns in each of a first subset and second subset of training patterns corresponding to the first neural network and the second neural network, respectively;
   determining, for the first neural network,
      a first upper bound on the Vapnik-Chervonenkis (VC) dimension based on the number of training patterns in the first subset of training patterns; and
      a first empirical error function based on the number of training patterns in the second subset of training patterns;
   generating, for the first neural network, a first error function based on the first empirical error and the first upper bound on the VC dimension;
   determining, for the second neural network,
      a second upper bound on the VC dimension based on the second subset of training patterns, and
      a second empirical error based on the first subset of training patterns;
   generating, for the second neural network, a second error function based on the second empirical error and the second upper bound on the VC dimension;
   determining a modified error function for the twin neural network based on the first error function and the second error function; and
   training the twin neural network by minimizing the modified error function, wherein the first error function denoted as E(+1) and the second error function denoted as E(−1) is represented by the following expressions:

$$E_{+1} = \frac{1}{2N_B}\sum_{i=1}^{N_B}(t_i - y_i)^2 + \frac{C_{+1}}{2N_A}\sum_{i=1}^{N_A}(w_{+1}^T\phi(x_{+1}^i) + b_{+1})^2$$

$$E_{-1} = \frac{1}{2N_A}\sum_{i=1}^{N_A}(t_i - y_i)^2 + \frac{C_{-1}}{2N_B}\sum_{i=1}^{N_A}(w_{-1}^T\phi(x_{-1}^i) + b_{-1})^2$$

wherein,
   $N_A$ is the number of training patterns in the first subset;
   $N_B$ is the number of training patterns in the second subset; and
   φ is the mapping between the input and the output layer of each of the first network and the second network.

4. A system for training a neural network, the system comprising:
   a processor to,
      determine, for the neural network, an upper bound on the Vapnik-Chervonenkis (VC) dimension;
      determine an empirical error function corresponding to the neural network;
      generate, for the neural network, a modified error function based on the upper bound on the VC dimension and the empirical error function; and
      train the neural network by minimizing the modified error function, wherein the modified error function is represented as:

$$E = \left[\frac{1}{2M}\sum_{i=1}^{M}(t_i - f(net_i))^2\right] + \frac{C}{2M}\sum_{i=1}^{M}i - 3(net^i)^2$$

wherein,
   M is the number of training patterns in the neural network;
   C represents a hyper-parameter; and
   $net^i$ represents net input to an output node of the neural network.

5. The system as claimed in claim 4, wherein the output node of the neural network utilizes a continuous and monotonically increasing function.

6. A system for training a twin neural network, the system comprising:
a processor to,
determine number of training patterns in each of a first subset and second subset of training patterns corresponding to the first neural network and the second neural network, respectively;
determine, for the first neural network,
a first upper bound on the Vapnik-Chervonenkis (VC) dimension based on the number of training patterns in the first subset of training patterns; and
a first empirical error function based on the number of training patterns in the second subset of training patterns;
generate, for the first neural network, a first error function based on the first empirical error and the first upper bound on the VC dimension;
determine, for the second neural network,
a second upper bound on the VC dimension based on the second subset of training patterns, and
a second empirical error based on the first subset of training patterns;
generate, for the second neural network, a second error function based on the second empirical error and the second upper bound on the VC dimension;
determine a modified error function for the twin neural network based on the first error function and the second error function; and
train the twin neural network by minimizing the modified error function, wherein the first error function denoted as E(+1) and the second error function denoted as E(−1) is represented by the following expressions:

$$E_{+1} = \frac{1}{2N_B}\sum_{i=1}^{N_B}(t_i - y_i)^2 + \frac{C_{+1}}{2N_A}\sum_{i=1}^{N_A}(w_{+1}^T\phi(x_{+1}^i) + b_{+1})^2$$

-continued $$E_{-1} = \frac{1}{2N_B}\sum_{i=1}^{N_A}(t_i - y_i)^2 + \frac{C_{-1}}{2N_B}\sum_{i=1}^{N_A}(w_{-1}^T\phi(x_{-1}^i) + b_{-1})^2$$

wherein,
$N_A$ is the number of training patterns in the first subset;
$N_B$ is the number of training patterns in the second subset; and
φ is the mapping between the input and the output layer of each of the first network and the second network.

7. A non-transitory computer readable medium comprising instruction executable by a processing resource, are to:
determine, for the neural network, an upper bound on the Vapnik-Chervonenkis (VC) dimension;
determine an empirical error function corresponding to the neural network;
generate, for the neural network, a modified error function based on the upper bound on the VC dimension and the empirical error function; and
train the neural network by minimizing the modified error function, wherein the modified error function is represented as:

$$E = \left[\frac{1}{2M}\sum_{i=1}^{M}(t_i - f(\text{net}_i))^2\right] + \frac{C}{2M}\sum_{i=1}^{M}(\text{net}^i)^2$$

wherein,
M is the number of training patterns in the neural network;
C represents a hyper-parameter; and
$\text{net}^i$ represents net input to an output node of the neural network.

8. The computer-readable medium as claimed in claim 7, wherein the modified error function is based on a net input to an output node of the neural network.

* * * * *